(12) United States Patent
Chang et al.

(10) Patent No.: US 11,572,041 B2
(45) Date of Patent: Feb. 7, 2023

(54) WIPER

(71) Applicant: Danyang UPC Auto Parts Co., Ltd., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/558,259

(22) Filed: Dec. 21, 2021

(65) Prior Publication Data
US 2022/0203939 A1 Jun. 30, 2022

(30) Foreign Application Priority Data
Dec. 30, 2020 (CN) .................. 202023330790.X

(51) Int. Cl.
*B60S 1/38* (2006.01)
*B60S 1/40* (2006.01)

(52) U.S. Cl.
CPC ........... *B60S 1/3853* (2013.01); *B60S 1/3849* (2013.01); *B60S 1/3851* (2013.01); *B60S 1/3881* (2013.01);
(Continued)

(58) Field of Classification Search
CPC .... B60S 1/3886; B60S 1/3889; B60S 1/3891; B60S 1/3894; B60S 1/3848; B60S 1/3849; B60S 1/3881; B60S 1/3882; B60S 1/3875; B60S 1/3851; B60S 1/3858; B60S 1/3874; B60S 1/3853; B60S 2001/3817; B60S 2001/3818
(Continued)

(56) References Cited

U.S. PATENT DOCUMENTS 7,503,095 B2 * 3/2009 Lin ..................... B60S 1/381
15/250.43
7,540,061 B1 * 6/2009 Huang ................. B60S 1/3881
15/250.43
(Continued)

FOREIGN PATENT DOCUMENTS

DE 102012209986 * 12/2013
WO 2004/078541 * 9/2004
(Continued)

OTHER PUBLICATIONS

Machine translation of description portion of German publication 102012209986, published Dec. 2013. (Year: 2013).*
(Continued)

*Primary Examiner* — Gary K. Graham
(74) *Attorney, Agent, or Firm* — Chun-Ming Shih; HDLS IPR Services

(57) ABSTRACT

The present disclosure related to a wiper including a buckling seat (10), an elastic arm (20), a scrapping strip (40) and an end sleeve (50). The elastic arm (20) is connected to the buckling seat (10) and has an end part (21) with a buckling hole (22), and one side of the elastic arm (20) has a bottom surface (23). The scrapping strip (40) is disposed on the bottom surface (23) of the elastic arm (20). The end sleeve (50) has a buckling hook (51) buckled with the buckling hole (22). Accordingly, the wiper may be easily assembled and the scrapping strip (40) may be effectively fastened.

6 Claims, 5 Drawing Sheets

(52) U.S. Cl.
CPC ........... *B60S 1/3889* (2013.01); *B60S 1/3891* (2013.01); *B60S 1/3894* (2013.01); *B60S 1/40* (2013.01); *B60S 2001/3817* (2013.01); *B60S 2001/3818* (2013.01)

(58) Field of Classification Search
USPC ........... 15/250.32, 250.43, 250.451, 250.201
See application file for complete search history.

(56) References Cited

U.S. PATENT DOCUMENTS

| | | | |
|---|---|---|---|
| 9,266,505 B2* | 2/2016 | Park | B60S 1/3874 |
| 2008/0052865 A1* | 3/2008 | Chiang | B60S 1/38 |
| | | | 15/250.43 |
| 2017/0057465 A1 | 3/2017 | Houssat et al. | |

FOREIGN PATENT DOCUMENTS

| | | | |
|---|---|---|---|
| WO | 2013/000650 | * | 1/2013 |
| WO | 2013042977 A2 | | 3/2013 |

OTHER PUBLICATIONS

Search Report dated May 23, 2022 of the corresponding European patent application No. 21216534.4.

\* cited by examiner

WIPER

BACKGROUND OF THE DISCLOSURE

Technical Field

The present disclosure relates to a wiper, particularly to a wiper capable of being easily assembled and allowing a scrapping strip to be fastened.

Description of Related Art

A related-art wiper at least includes an elastic piece, a scrapping strip, and a buckling seat. The scrapping strip is disposed at one side of the elastic piece, the buckling seat is disposed at another side of the elastic piece, and the buckling seat is used for buckling a wiper arm. When the wiper arm presses the wiper against a glass, the elastic piece allows the scrapping strip to be adjacently arranged and pressed on a glass surface.

When the wiper is desired to be assembled, the buckling seat is firstly riveted with the elastic piece and then the scrapping strip is buckled with the buckling seat. As such, the scrapping strip may interfere with the buckling seat and may not be easily assembled, moreover, the scrapping strip may be loosened after being operated in a long time. How to allow the wiper to be easily assembled and allow the scrapping strip to be effectively fastened are the problems need to be improved.

Accordingly, the applicant of the present disclosure has devoted himself for improving the mentioned disadvantages.

SUMMARY OF THE DISCLOSURE

The present disclosure is to provide a wiper capable of being assembled and allowing a scrapping strip to be effectively fastened.

Accordingly, the present disclosure provides a wiper, which includes a buckling seat, at least one elastic arm, a scrapping strip and at least one end sleeve. The elastic arm is connected to the buckling seat and has an end part, one side of the elastic arm has a bottom surface, and the end part has a buckling hole. The scrapping strip is disposed on the bottom surface of the elastic arm. The end sleeve is sleeved with the end part of the elastic arm and longitudinally blocks the scrapping strip along the elastic arm, and the end sleeve has a buckling hook buckled with the buckling hole.

Advantages achieved by the present disclosure are as follows. The end sleeve is fastened on the elastic arm through the buckling hole and the buckling hook. With a clipping claw of each rack member, the elastic arm may be limited in a slot channel to prevent from loosening from a connecting unit. With a flow guiding cover covering each elastic arm, rainwater may be prevented from entering the elastic arm in the connecting unit.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE EMBODIMENTS

Figure 1:
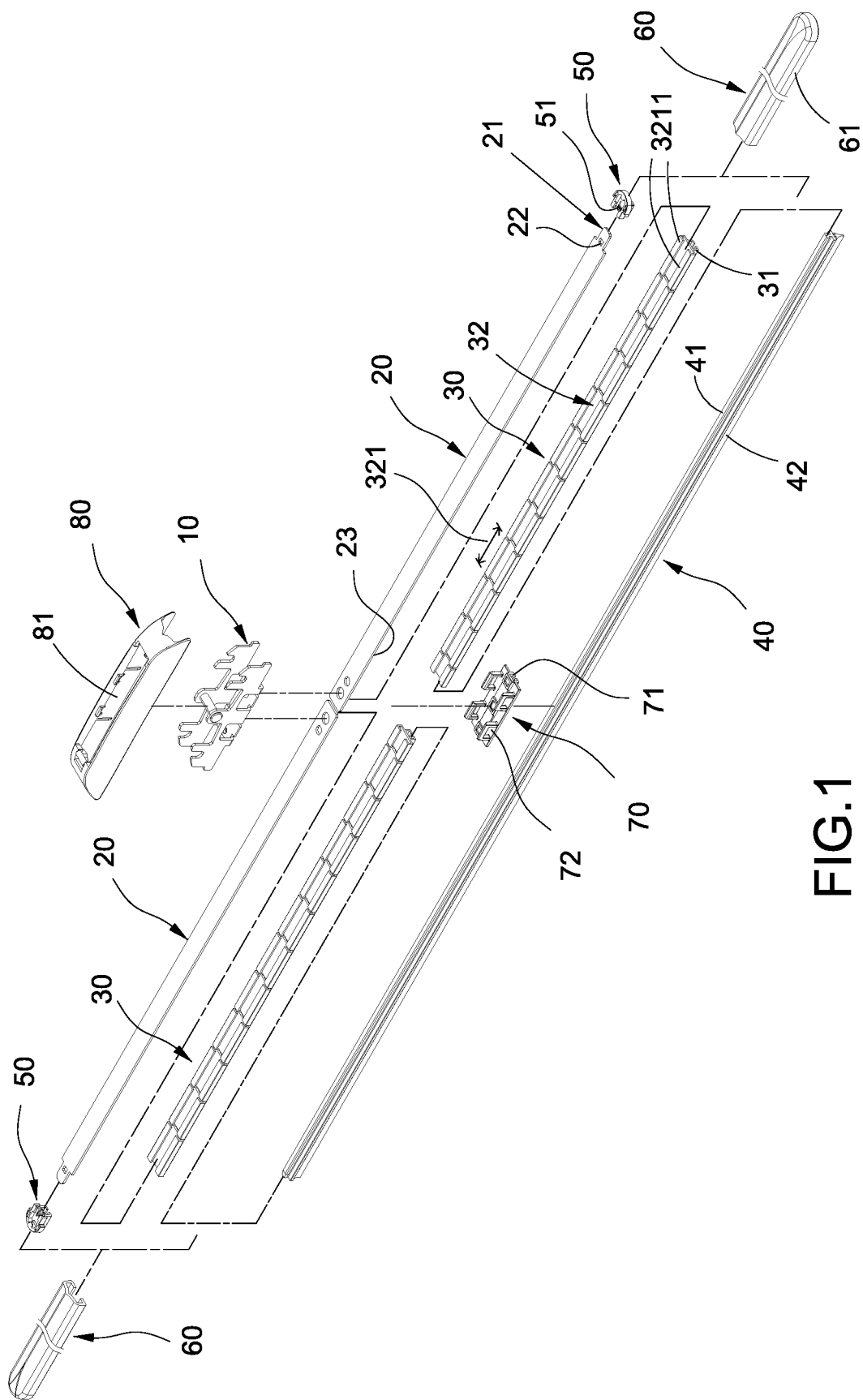
FIG. 1 is a perspective exploded view according to the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

The present disclosure provides a wiper, which is used for scrapping rainwater on a windshield. Please refer from FIG. 1 to FIG. 5, the wiper includes a buckling seat 10, elastic arms 20 connected to the buckling seat 10, a scrapping strip 40, connecting units 30 disposed between the elastic arms 20 and the scrapping strip 40, and end sleeves 50 disposed on the elastic arms 20. The buckling seat 10 is connected to the elastic arms 20 to allow a wiper arm (not shown in figures) to be buckled.

According to the present disclosure, the locations where the elastic arms 20 are connected to the buckling seat 10 are not intended to be limiting. In some embodiments, the buckling seat 10 is connected to one end of each of the elastic arms 20 and the buckling seat 10 is connected to the pair of elastic arms 20. Each of the elastic arms 20 is disposed with the corresponding connecting unit 30, the scrapping strip 40 passes through each of the connecting units 30 to be connected to each of the elastic arms 20. As shown in FIG. 1, another end of each of the elastic arms 20 is sleeved with (sheathed in) the end sleeve 50 to block the connecting units 30 and the scrapping strip 40.

Figure 2:
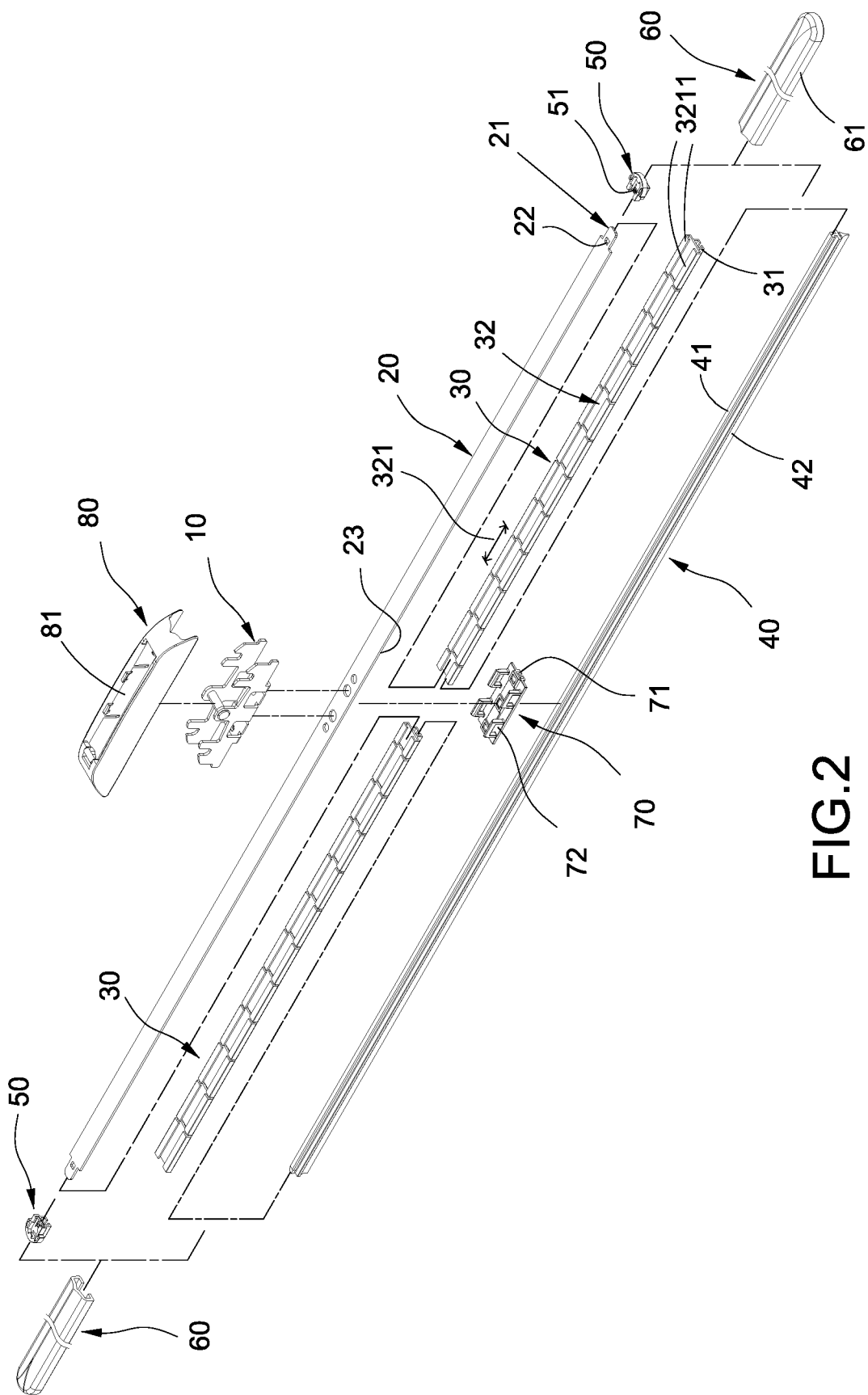
FIG. 2 is a perspective exploded view according to another embodiment of the present disclosure.
Figure 3:
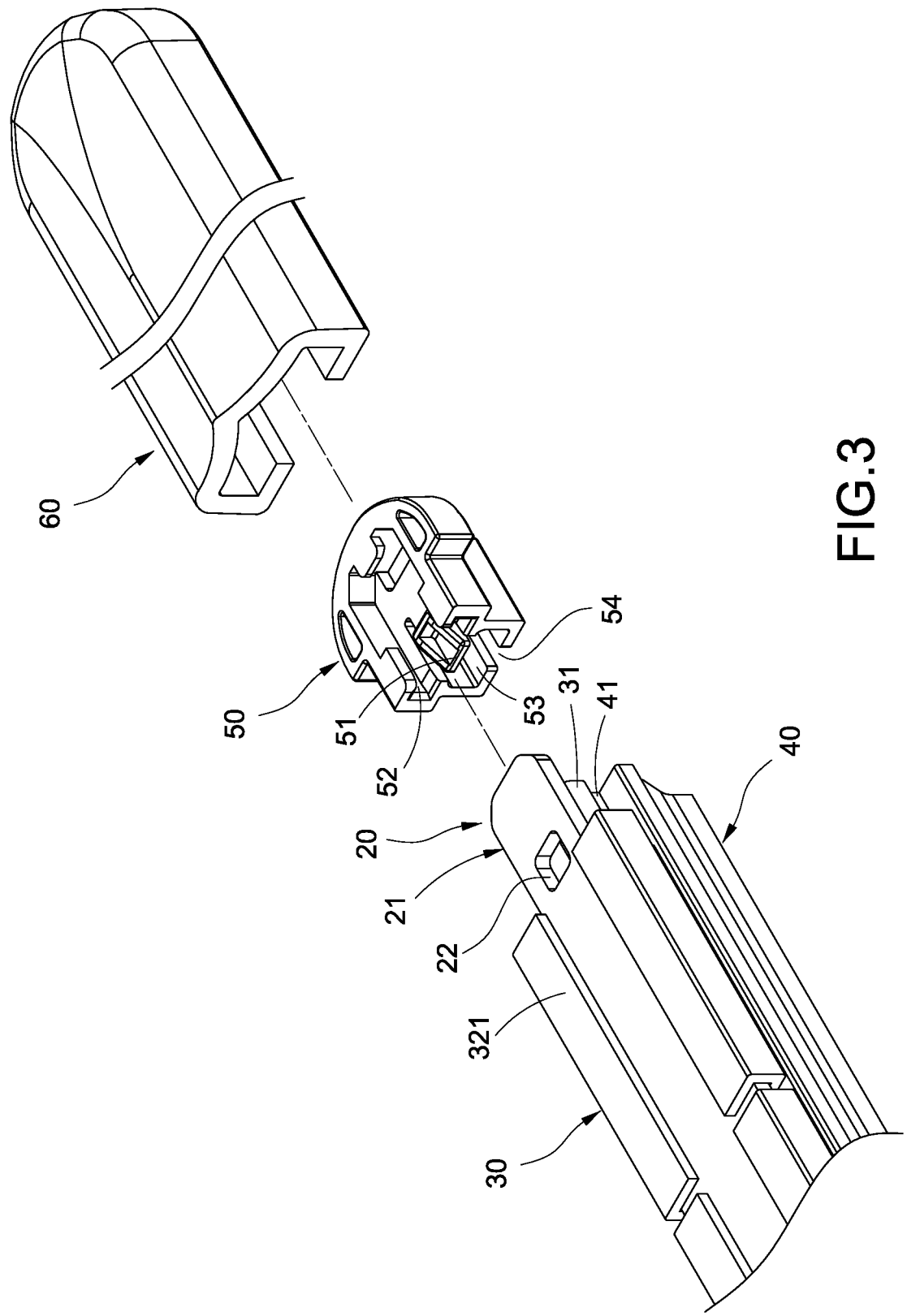
FIG. 3 is a perspective exploded view showing the elastic arm and the end sleeve according to the present disclosure.

However, the present disclosure is not intended to be limiting, as shown in FIG. 2, the buckling seat 10 may be connected to a center of a single elastic arm 20, the pair of connecting units 30 are sleeved with the elastic arm 20 from two ends of the elastic arm 20 so as to be oppositely located at two sides of the buckling seat 10, and the two ends of the elastic arm 20 are respectively disposed with the end sleeves 50.

In some embodiments, structural features of the two elastic arms 20 are the same, thus only one of the elastic arms 20 is described and descriptions for the other elastic arms 20 is omitted for brevity. The elastic arm 20 is an elongated metal piece, and has a bottom surface 23 formed at one side thereof, one end of the elastic arm 20 is connected and buckled with the buckling seat 10, another end thereof has an end part 21, and the end part 21 has a buckling hole 22. Details are provided as follows. Each of the elastic arms 20 is formed in an arc shape, and the two elastic arms 20 are continuously connected to make the whole body of the wiper be in an arc shape. In some embodiments, each of the elastic arms 20 is riveted with the buckling seat 10, but here is not intended to be limiting. In some embodiments, the elastic arm 20 may be screwed and locked, soldered or buckled with the buckling seat 10.

In one of the exemplary embodiments, structural features of the two connecting units 30 are the same, thus only one of the connecting units 30 is described and description for the other connecting unit 30 is omitted for brevity. A bottom guiding rail 31 is disposed at one side of the connecting unit 30, the bottom guiding rail 31 is longitudinally extended along the connecting unit 30, and another side of the connecting unit 30, which is opposite to the side where the bottom guiding rail 31 is disposed, covers the bottom surface 23 of the corresponding elastic arm 20. Details are provided as follows. The connecting unit 30 is an elastic elongated member made of an elastic material, the connecting unit 30 has a slot channel 32 allowing the corresponding elastic arm 20 to be disposed, each of the slot channels 32 has a plurality of rack units 321 mutually connected, and the elastic arm 20 sequentially passes each of the rack units 321. As such, when the elastic arm 20 is deformed by an external force, the gaps formed between the rack units 321 may allow the slot channel 32 being deformed following the deformation of the elastic arm 20, and the operation of the elastic arm 20 is not interfered. In some embodiments, each of the rack units 321 has a pair of clipping claws 3211, and the pair of clipping claws 3211 are disposed to clip at two lateral edges of the elastic arm 20, but here is not intended to be limiting, the rack unit 321 may be a rectangular rack allowing the elastic arm 20 to pass.

A top guiding rail 41 is disposed at one side of the scrapping strip 40, and the top guiding rail 41 is longitudinally extended along the scrapping strip 40 and disposed in each of the bottom guiding rails 31. Details are provided as follows. The scrapping strip 40 is in an elongated shape, and another side of the scrapping strip 40, opposite to the side where the top guiding rail 41 is disposed, has a blade part 42, and the blade part 42 is used for scraping rainwater on a windshield.

In some embodiments, structural features of the two end sleeves 50 are the same, thus only one of the end sleeves 50 is described and description for the other end sleeve 50 is omitted for brevity. In one of the exemplary embodiments, the end sleeve 50 is a plastic piece formed in one piece with an injection molding method. The end sleeve 50 is disposed at the end part 21 of the elastic arm 20 and covers one end of the top guiding rail 41 and one end of the bottom guiding rail 31, and the end sleeve 50 longitudinally blocks the connecting unit 30 and the scraping strip 40 to preventing the connecting unit 30 and the scrapping strip 40 from loosening. The end sleeve 50 has a buckling hook 51, and the buckling hook 51 is buckled with the buckling hole 22 to make the end sleeve 50 be fastened on the elastic arm 20. Details are provided as follows. Please refer to FIG. 3, the end sleeve 50 has a top covering slot 52 and a bottom covering slot 53, the buckling hook 51 is formed between the top covering slot 52 and the bottom covering slot 53. A notch 54 communicating with the bottom covering slot 53 is formed at a bottom end of the end sleeve 50. The top covering slot 52 and the bottom covering slot 53 respectively cover and sheathe the end part 21 of the elastic arm 20 and the bottom guiding rail 31, and the top guiding rail 41 is disposed in the notch 54 to make the elastic arm 20, the connecting unit 30 and the scrapping strip 40 be transversally restrained.

Figure 4:
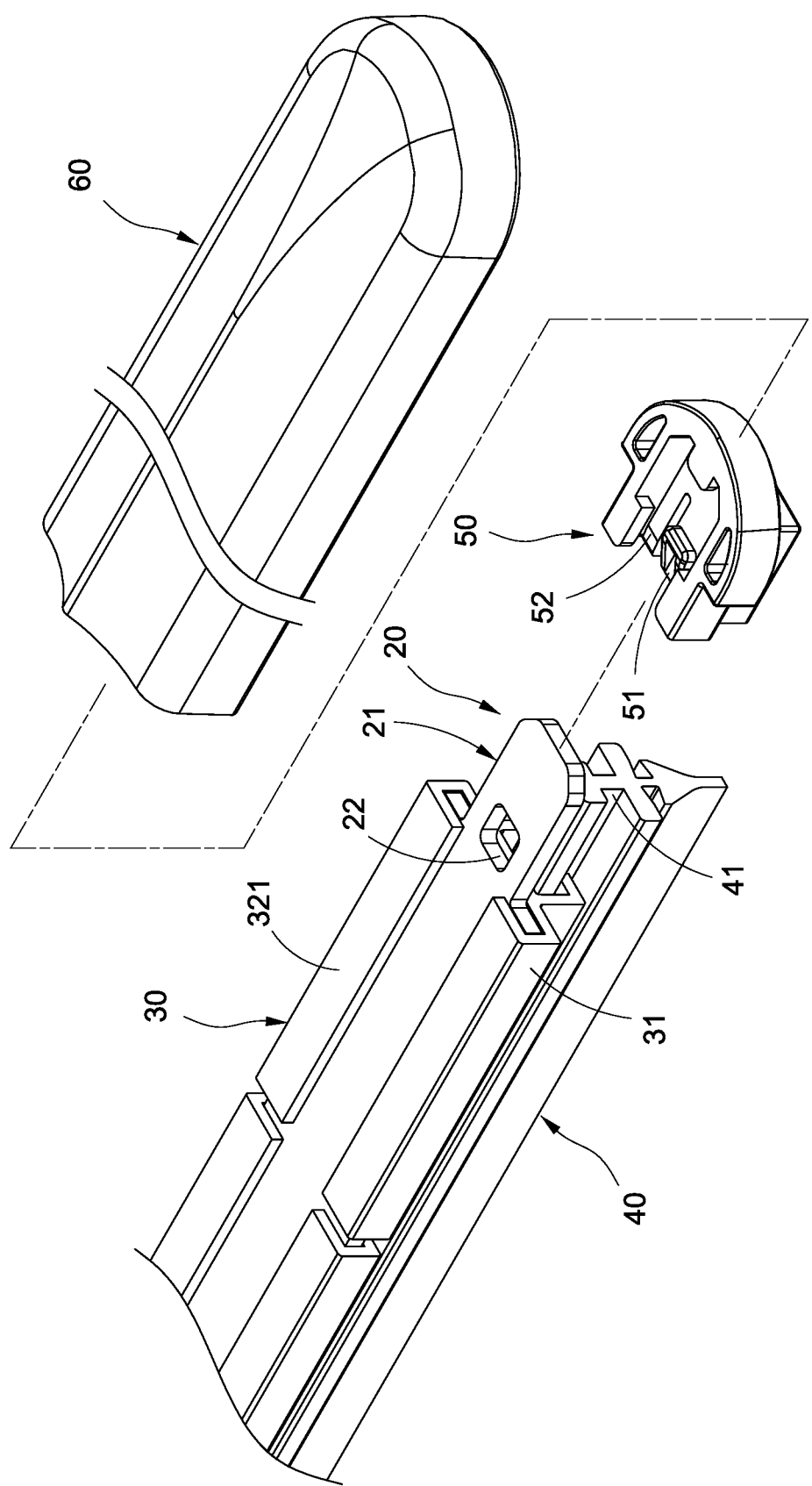
FIG. 4 is another perspective exploded view of FIG. 2.
Figure 5:
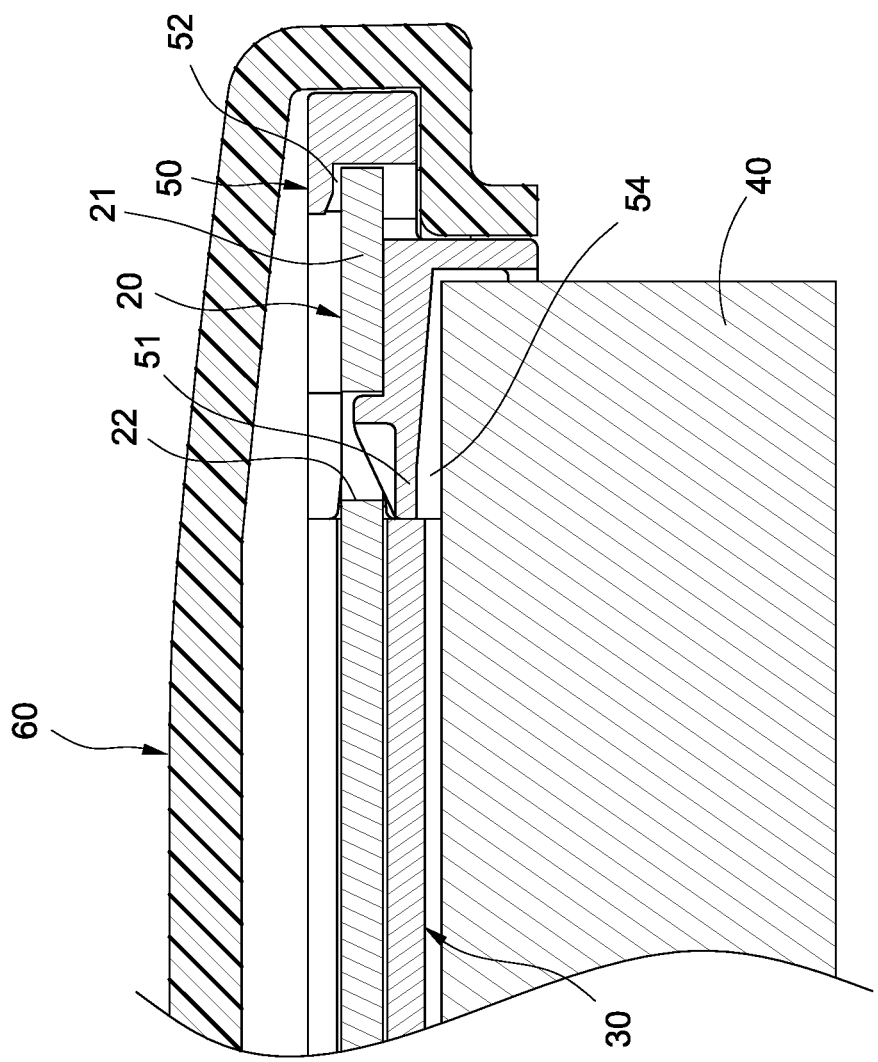
FIG. 5 is a cross sectional side view according to the present disclosure.

Please refer to FIG. 1, FIG. 4 and FIG. 5, the wiper provided by the present disclosure further includes a pair of flow guiding covers 60, which are elongated covering pieces made of a plastic material. An outer side of each of the flow guiding covers 60 is protruded with a rib part 61 longitudinally extended, each of the flow guiding covers 60 covers each of the elastic arms 20 to guide an airflow passing a surface of the wiper, and the flow guiding cover 60 covers the end sleeve 50 to prevent the end sleeve 50 from loosening from the elastic arm 20, the connecting unit 30 and the scrapping strip 40. Moreover, each of the flow guiding covers 60 covers the slot channel 32 of the corresponding connecting unit 30 to prevent the rainwater from entering the elastic arm 20 in the slot channel 32.

Details are provided as follows. Please refer from FIG. 1, the wiper provided by the present disclosure further includes a block member 70, and the block member 70 is connected between each of the connecting units 30. In some embodiments, a plurality of latching hooks 72 are extended from two lateral edges of the block member 70 so as to be latched with the buckling seat 10. The two elastic arms 20 are connected at the same side of the buckling seat 10, connecting end parts of the two elastic arms 20 and the buckling seat 10 are separate from each other so as to be clamped between the block member 70 and the buckling seat 10, and the block member 70 is able to prevent the rainwater from being remained between the two connecting units 30 or between the end parts 21 of the two elastic arms 20. Moreover, the block member 70 has a connecting segment 71, a shape of the connecting segment 71 is continuous related to shapes of the pair of the bottom guiding rails 31 so as to be connected to the pair of bottom guiding rails 31, and the top guiding rail 41 may be sleeved in one of the bottom guiding rails 31 and further sleeved with the other bottom guiding rail 31 via the connecting segment 71.

A shape of the block member 70 on a bottom end of the buckling seat 10 is continuous related to the shape of the flow guiding cover 60, thus the block member 70 may be correlative to an opening of the flow guiding cover 60 between the pair of the flow guiding covers 60. The wiper provided by the present disclosure further includes a protecting cover 80, the protecting cover 80 covers the buckling seat 10 and an end part of each of the flow guiding covers 60 adjacent to the buckling seat 10, thus the two flow guiding covers 60 may be smoothly connected, and the protecting cover 80 has a penetrated opening 81 to allow the wiper arm to penetrate and to be buckled in the buckling seat 10.

Specifically, an assembling method of the present disclosure is provided as follows. The buckling seat 10 is riveted and fastened with the two elastic arms 20. The slot channel 32 of each of the connecting units 30 is disposed on the corresponding elastic arm 20, and the block member 70 is buckled in the buckling seat 10. The top guiding rail 41 of the scrapping strip 40 is sleeved in from the bottom guiding rail 31 of one of the connecting units 30, and sleeved in the other bottom guiding rail 31 after passing the connecting segment 71 of the block member 70. The end sleeve 50 is adapted to sheathe the elastic arm 20 to make the buckling hook 51 be buckled and fastened in the buckling hole 22 of the corresponding elastic arm 20, and the end sleeve 50 sheathes and covers the end part 21 of the elastic arm 20, the bottom guiding rail 31 of the connecting unit 30 and the top guiding rail 41 of the scrapping strip 40 to prevent the connecting unit 30 and the scrapping strip 40 from loosening. The two flow guiding covers 60 respectively cover the corresponding elastic arm 20 and the connecting unit 30. Then, the protecting cover 80 covers the buckling seat 10 to finish the assembly of the wiper of the present disclosure.

While this disclosure has been described by means of specific embodiments, numerous modifications and variations could be made thereto by those skilled in the art without departing from the scope and spirit of this disclosure set forth in the claims.

What is claimed is:

1. A wiper, comprising:

a buckling seat (10);

at least one elastic arm (20), connected to the buckling seat (10), wherein the at least one elastic arm (20) comprises an end part (21) and a bottom surface (23) disposed on one side thereof, and a buckling hole (22) is defined on the end part (21);

a scrapping strip (40), disposed on the bottom surface (23) of the at least one elastic arm (20);

at least one end sleeve (50), adapted to sheathe the end part (21) of the at least one elastic arm (20) and longitudinally blocking the scrapping strip (40) along the at least one elastic arm (20), wherein the at least one end sleeve (50) comprises a buckling hook (51) buckled with the buckling hole (22); and at least one connecting unit (30), adapted to sheathe the at least one elastic arm (20), and one side of the at least one connecting unit (30) covering the bottom surface (23) of the at least one elastic arm (20);

wherein the at least one connecting unit (30) comprises a bottom guiding rail (31) disposed on another side thereof opposite to the one side covering the at least one elastic arm (20), the bottom guiding rail (31) is longitudinally extended along the at least one connecting unit (30), the scrapping strip (40) comprises a top guiding rail (41) disposed on one side thereof, the top guiding rail (41) is longitudinally extended along the scrapping strip (40) and passes through the bottom guiding rail (31), and the at least one end sleeve (50) covers one end of the top guiding rail (41) and one end of the bottom guiding rail (31) to longitudinally block the at least one connecting unit (30) along the at least one elastic arm (20);

wherein the at least one elastic arm (20) is two in number, the at least one connecting unit (30) and the at least one end sleeve (50) are correspondingly two in number, one end of each of the elastic arms (20) is buckled with the buckling seat (10) and the elastic arms (20) are oppositely extended from the buckling seat (10), each of the connecting units (30) is adapted to sheathe each of the elastic arms (20), one side of each of the connecting units (30) is disposed with the bottom guiding rail (31), and the top guiding rail (41) is sheathed in each of the bottom guiding rail (31);

wherein a block member (70) is disposed between the pair of connecting units (30), the block member (70) is buckled with the buckling seat (10), and the top guiding rail (41) is sheathed in the block member (70).

2. The wiper according to claim 1, wherein each end sleeve (50) comprises a top covering slot (52) and a bottom covering slot (53), each buckling hook (51) is disposed between the respective top covering slot (52) and the bottom covering slot (53), each top covering slot (52) is adapted to sheathe and cover the end part (21) of a respective elastic arm (20), and each bottom covering slot (53) is adapted to sheathe and cover a respective bottom guiding rail (31).

3. The wiper according to claim 2, wherein a notch (54) is defined on a bottom end of each end sleeve (50) and communicates with a respective bottom covering slot (53), and the top guiding rail (41) is disposed in each notch (54).

4. The wiper according to claim 1, wherein the block member (70) comprises a connecting segment (71), shape of the connecting segment (71) is continuous with shapes of the pair of the bottom guiding rails (31) to be connected to the pair of bottom guiding rails (31), and the top guiding rail (41) and the connecting segment (71) are sleeved with each other.

5. The wiper according to claim 1, further comprising: a pair of flow guiding covers (60), wherein each of the flow guiding covers (60) covers each of the elastic arms (20) and covers each of the slot channels (32) and each of the end sleeves (50).

6. The wiper according to claim 5, further comprising: a protecting cover (80), wherein the protecting cover (80) covers the buckling seat (10) and an end part of each of the flow guiding covers (60) adjacent to the buckling seat (10).

\* \* \* \* \*